US007008230B2

(12) United States Patent
Hoglund

(10) Patent No.: US 7,008,230 B2
(45) Date of Patent: Mar. 7, 2006

(54) FIREFIGHTER'S TRAINING SIMULATOR

(75) Inventor: Russell W. Hoglund, Duluth, MN (US)

(73) Assignee: Superior Simulation Technologies, Duluth, MN (US)

( * ) Notice: Subject to any disclaimer, the term of this patent is extended or adjusted under 35 U.S.C. 154(b) by 86 days.

(21) Appl. No.: 10/827,960

(22) Filed: Apr. 20, 2004

(65) Prior Publication Data
US 2005/0233289 A1 Oct. 20, 2005

(51) Int. Cl.
G09B 9/00 (2006.01)

(52) U.S. Cl. ...................... 434/236; 434/219
(58) Field of Classification Search ............... 434/226, 434/219; 296/160
See application file for complete search history.

(56) References Cited

U.S. PATENT DOCUMENTS

| 2,961,255 | A | * | 11/1960 | Trott ........................ 160/23.1 |
| 3,042,425 | A | * | 7/1962 | Cathey et al. ................ 52/69 |
| 4,001,949 | A | | 1/1977 | Francis |
| 4,201,123 | A | * | 5/1980 | Maciag et al. ............... 454/94 |
| 4,262,956 | A | * | 4/1981 | Kellam .................... 296/26.07 |
| 4,299,579 | A | | 11/1981 | Swiatosz et al. |
| 4,526,548 | A | | 7/1985 | Livingston |
| 4,611,847 | A | * | 9/1986 | Sullivan .................. 296/180.2 |
| 4,861,270 | A | | 8/1989 | Ernst et al. |
| 4,983,124 | A | | 1/1991 | Ernst et al. |
| 5,173,052 | A | | 12/1992 | Duncan, Jr. |
| 5,181,851 | A | | 1/1993 | Layton et al. |
| 5,203,707 | A | | 4/1993 | Musto et al. |
| 5,226,818 | A | | 7/1993 | Feiock et al. |
| 5,275,571 | A | | 1/1994 | Musto et al. |
| 5,316,484 | A | | 5/1994 | Layton et al. |
| 5,320,536 | A | | 6/1994 | Rogers et al. |
| 5,415,551 | A | | 5/1995 | Semenza |
| 5,518,402 | A | | 5/1996 | Tommarello et al. |
| 5,752,835 | A | * | 5/1998 | Whitmer, Sr. ............... 434/226 |
| 5,927,990 | A | | 7/1999 | Welch et al. |
| 6,179,620 | B1 | | 1/2001 | Schmid |
| 6,358,057 | B1 | * | 3/2002 | Bishop ....................... 434/226 |
| 6,799,975 | B1 | * | 10/2004 | Dunn ......................... 434/365 |
| 2003/0124496 | A1 | | 7/2003 | Hough |
| 2003/0198923 | A1 | | 10/2003 | Westra |

FOREIGN PATENT DOCUMENTS

| BR | 9902424 A | * | 1/2001 |
| EP | 146465 A2 | * | 6/1985 |
| FR | 2698471 A1 | * | 5/1994 |

* cited by examiner

Primary Examiner—Derris H. Banks
Assistant Examiner—Dmitry Suhol
(74) Attorney, Agent, or Firm—Nikolai & Mersereau, P.A.

(57) ABSTRACT

A mobile simulator for use in firefighting training exercises. The mobile simulator includes a plurality of rooms, including a room for simulating a kitchen fire, and a room for simulating a wall fire condition. The mobile simulator also includes a confined space under the trailer for simulating firefighting in a crawl space. The top surface of the trailer also includes a dome projecting upward from the trailer where the dome has a plurality of knock out panels for attic venting training.

10 Claims, 3 Drawing Sheets

FIREFIGHTER'S TRAINING SIMULATOR

FIELD OF THE INVENTION

The invention relates to a simulator for training firefighters to fight house fires, and, in particular, the invention related to trailer designed to train and certify firefighters in multiple firefighting scenarios.

BACKGROUND OF THE INVENTION

Firefighting training facilities are an important tool in improving public safety. As explained in U.S. Pat. No. 4,526,548, firefighting facilities can be permanent tower-type structures or mobile. Mobile simulators are useful in exurbia or rural areas where fire departments cannot afford to build permanent structures for its firefighting training. However, the prior art trailer-type vehicles often fail to train for a variety of situations. Given the space restrictions of a trailer-type vehicle, many different fire fighting scenarios may not be accommodated. Prior art trailer-type simulators lack the means to train firefighters to cope with critical situations including: (1) maneuvering through a confined space, such as a crawl space, during a fire; (2) accessing the building through the roof of the structure; (3) putting out the fire from the outside the building; and (4) fighting a fire in an enclosed stairwell. Further, many mobile simulators known in the prior art do not possess all of the fire fighting scenarios necessary to provide certification that an individual has mastered all of the necessary skills required by state or municipal regulations governing the qualifications of firefighters.

SUMMARY OF THE INVENTION

The present invention is a new and improved simulator for use in firefighting training exercises. The primary goal of the present invention is to train firefighters to handle a variety of structural firefighting scenarios.

A first goal of the present intention is to provide a semi-trailer training vehicle having an enclosed place for trainees to learn and rehearse dealing with confined crawl spaces when fighting structural fires. In an actual firefighting scenario, a firefighter may often have to make his or her way through a crawl space that is filled with obstacles and smoke. To that end, an enclosed space is provided beneath the trailer. Smoke can be pumped into the enclosed space, and objects placed in the enclosed space, so as to simulate a crawl space setting. The trainee maneuvers his or her way through the enclosed space and enters or exits the trailer from an opening connecting the interior of the trailer and the enclosed space. In this way the trainee may be evaluated for claustrophobic tendencies.

An additional goal of the present invention is to provide a fire fighting trailer having an enclosed staircase for trainees to learn and rehearse fighting fires on such staircases. In the field, firefighters frequently have to move from a first floor level to a second floor level of the burning structure. The staircase and/or the sloped ceiling of the staircase may be on fire. The staircase may be engulfed in smoke. There may be a fire underneath the stairs themselves. The present invention provides an enclosed staircase attachment for the trailer. A burner and smoke generator are placed under the staircase to provide an environment like that which may be encountered in dealing with a residential fire and which trains and tests the trainee in dealing with this dangerous situation.

A further goal of the present invention, not provided for by prior art mobile simulators, is to provide roof venting training. A hazardous facet of firefighting is the task of climbing atop of a roof of a burning structure to puncture the roof in order to vent the heat and gasses from the building. Typically, firefighters will lance a hole in the roof using any number of tools, including an axe. The present invention provides replaceable, knock-out panels which are knocked out by the trainee so as to simulate roof venting in the field.

An additional objective of the present invention is to provide additional smoke training. The evacuation of smoke from a structural fire is an essential task in firefighting. The most typical way to evacuate smoke from a structure is to blow out the windows. Since repeated replacement of glass windows is costly, the present invention provides replaceable knockout windows for repeated smoke training drills.

Still another objective of the present invention is to provide falling ceiling training. In a structural fire parts of the ceiling may be consumed in the fire, resulting in the collapse of the entire ceiling of a room. This can be exceedingly dangerous, and there is a need for the firefighter to identify when such situations are going to happen. The present invention trains firefighters to identify and tackle this problem by providing a combustible panel releasably attached to the ceiling and under control of an instructor for simulating a falling ceiling.

These and other advantages of the present invention will become apparent to those skilled in the art after reviewing the following detailed description of the preferred embodiment, especially when considered in conjunction with the claims and drawings in which the numerals in the several views refer to corresponding parts.

DESCRIPTION OF THE PREFERRED EMBODIMENT

Figure 1:
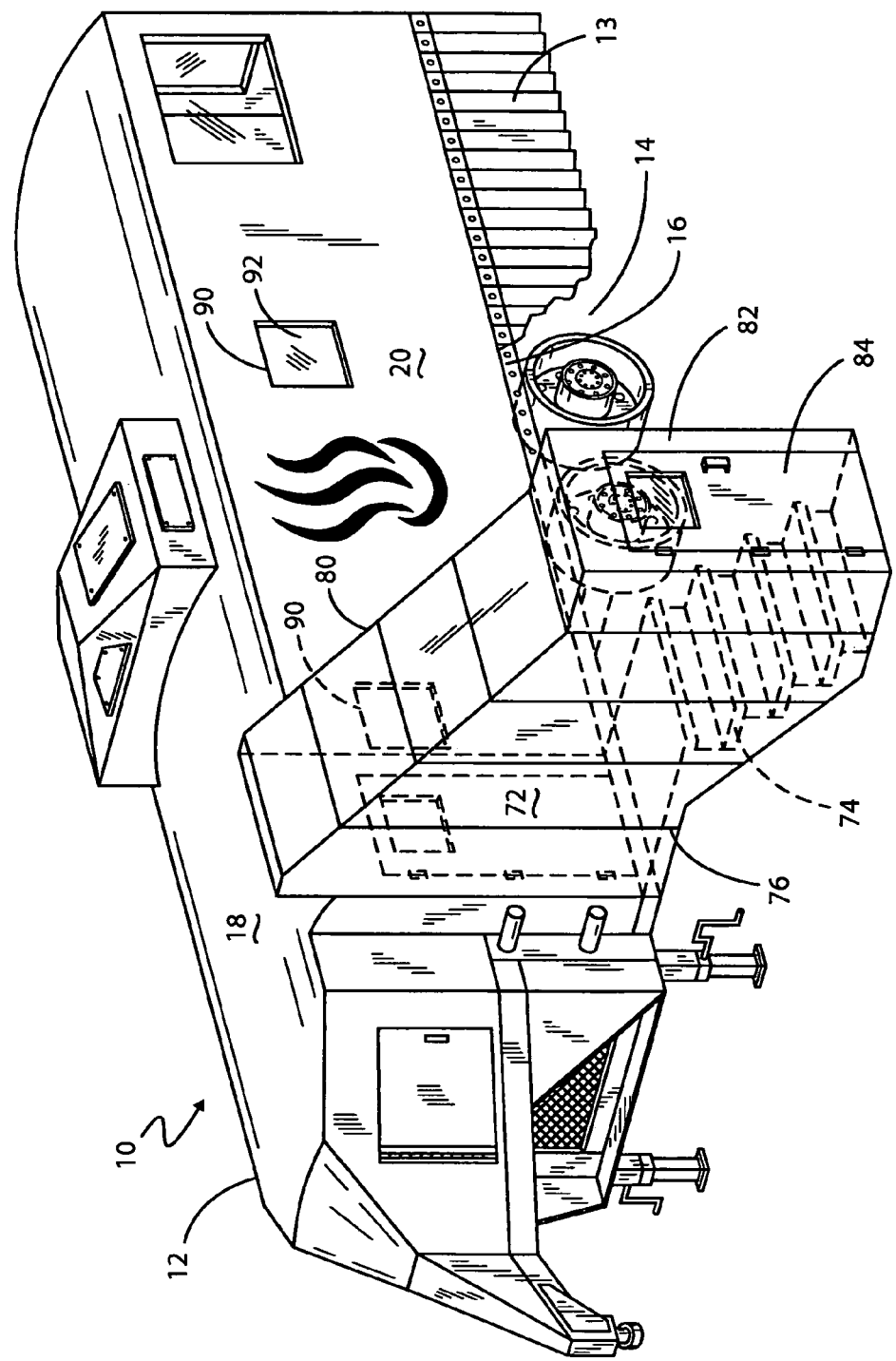
FIG. 1 is a side perspective view of the outside of the mobile simulator for use in firefighting training exercises.

Referring first to FIG. 1 the preferred embodiment of the present invention comprises a mobile simulator for use in firefighting training exercises. As shown in FIG. 1, the simulator 10 includes a semi-trailer body 12 and a confined space 14 formed underneath the trailer body 12. The combined space is totally enclosed by a downwardly depending curtain 13 extending from the floor of the trailer body to the ground.

Figure 2:
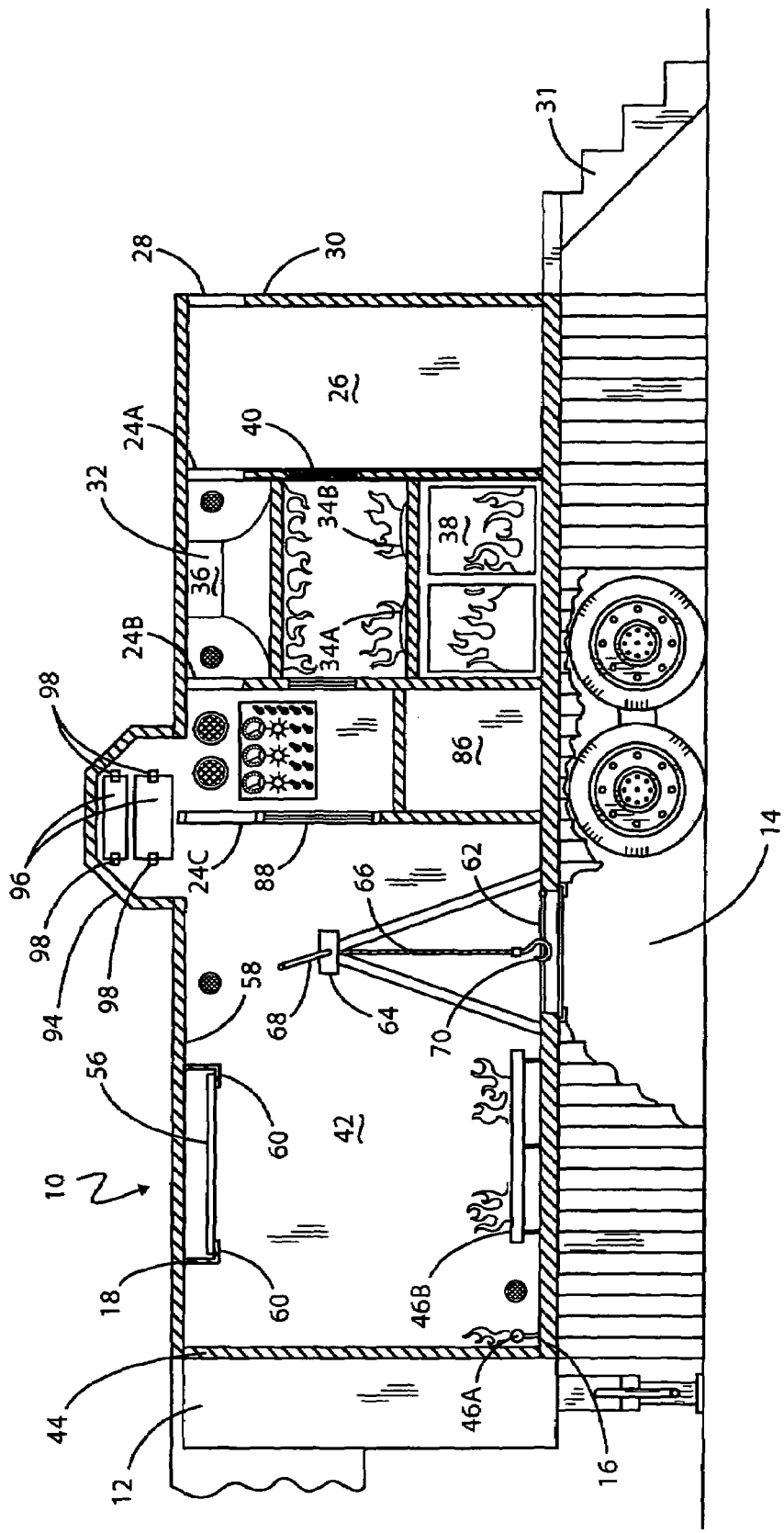
FIG. 2 is a side elevation view, partly in section, of the mobile simulator arranged according to the floor plan shown in FIG. 3.
Figure 3:
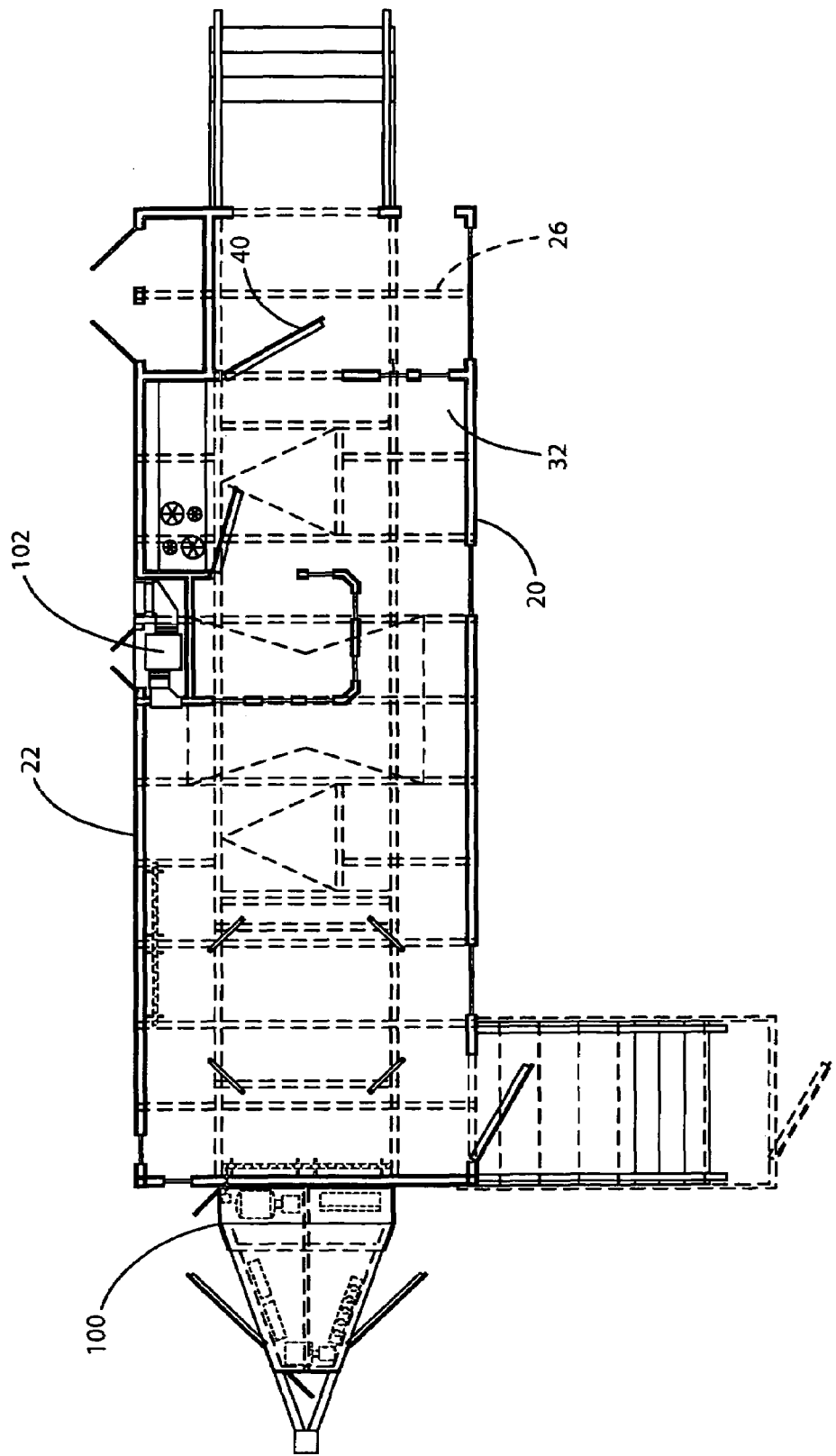
FIG. 3 is a schematic floor plan for the mobile simulator.

The trailer body 12 has a generally rectangular configuration defined by a trailer floor 16 (FIG. 2), a trailer roof 18, and a first and second sidewall 20, 22 As can be seen in FIG. 2, the trailer is divided into a plurality of rooms by a plurality of vertical partitions 24A, 24B, and 24C. A first room 26 is defined by a first end wall 28 of the trailer body 12 and a first partition 24A. First room 26 may serve a dual purpose. It can be used first as a storage area when the simulator 10 is in transit or not in use. Room 26 can also be used as a staging area for training exercises where the firefighter trainee suits up and equips himself or herself. A first door 30 is located in the first end wall 28 to allow access to and from outside the trailer 12. Removable stairs 31 allow persons to move between ground level and the level of the floor 16.

A second room 32 is proximate to the first room 26. The second room 32 is defined by partitions 24A and 24B. The second room simulates a kitchen. The second room 32 contains a first and second gas burner, 34A and 34B, a range hood 36, and kitchen cabinets 38. The second room 32 is preferably used for fire extinguisher training, although other scenarios can be devised. The first and second gas burners 34a and 34b are capable of generating flames similar to that which typically result from grease or kitchen fires. This gives a trainee the opportunity to be trained and tested in his or her use of a fire extinguisher to deal with hazards encountered in kitchen fires. The trainee can access the second room 32 through a door 40 located in first partition 24A.

A third room 42 termed the "hot room" is located at the opposite end of the trainer 12 from the first room 26. The third room is defined by a second trailer end wall 44 and a third partition 24C. The third room 42 helps with hot room training. Mounted on end wall 44 and second sidewall 22 are identical burner units 46A and 46B, which when used together may simulate a wall fire effect in a fire. The burners 46(a) and 46(b) are located near the trailer floor 16 and adjacent to one end wall 14 and a sidewall 20 or 22. The fuel delivered thereto, when ignited laps the walls, simulating a condition where a all of combustible material is actually aflame. As a safety measure, a sensor 47 is provided to detect the presence or build-up of unburned fuel so that no harmful explosion will occur.

Burner units 46(a) and 46(b) simulate a wall fire effect. Either or both burner units 46(a) and 46(b) may be engaged to vary the difficulty of the firefighting scenario.

Also included in the third room 42 is a combustible panel 56 that is releasably attached to a hot room ceiling 58. The combustible panel 56 is attached to the hot room ceiling 58 by a first and second bracket 60 which depend from the hot room ceiling 58. The combustible panel 56 rests on the brackets 60 until combustible panel 56 is ignited. This simulates a ceiling fire and gives a trainee the opportunity to practice coping with such a situation. The trainee can then knock the combustible panel 56 to the floor using axes or other such tools.

The trailer floor 16 in the third room 42 offers an access panel 62 which allows access to the confined space 14. The confined space comprises curtains 13 that hang from the trailer floor 16 down to the ground. The curtains are opaque such that the space defined by the curtains is dark. Obstacles, not shown, may be strategically placed in the confined space to render a training exercise more realistic.

A trainee gains access to the confined space 14 via an access panel 62 that may be lifted from the trailer floor. As a further training exercise, a first trainee may be require to assemble a tripod winch 64 that when set up over the opening in which the access panel 62 fits. A crank operated reel carrying a chain or cable 66 and a hook 70 can be used to lower or raise a trainee from the confined space or be used to lower equipment to a person in the confined space 14.

As shown in FIG. 1 the first side wall 20 has a second door 72 exiting the third room 42 into an enclosed declining staircase 74 located outside the trailer. The enclosure surrounding the declining staircase 74 comprises a first and second collapsible sidewall 76 and 78, collapsible enclosure roof 80, and an end wall 82 disposed at the bottom of the declining staircase with an enclosure door 84. The walls and stairs comprising the stairwell are adapted to be stored in the storage area 26 when not being used. When erected, however, a trainee can exit the third room 42 onto the enclosed declining staircase 74, descend the declining staircase 74, and exit the enclosure through the enclosed door 84. Smoke can be piped into the enclosure to simulate a fire. Further, a gas burner panel can be positioned on or beneath the stairs to simulate a fire under the stairs.

The second and third portions 24B and 24C form a final room which serves as a master control room 86. A clear panel or window 88 is disposed in the third partition 24C and a similar panel or window 89 is presnet in the partition 24(b). The clear panels 88 and 89 allow an occupant of the master control room 86 to observe the progress of the training session in both the second and thirds room 32 and 42, respectively.

The first sidewall 20 of the trailer 12 has a first and a second window, as at 90. The windows 90 are spanned with a knock out plexiglass 92. The knockout plexiglass 92 is capable of being blown out of the frame of window 90 by the impact of a high pressure stream of water which is being discharged from a fire hose that is attached to a hydrant or other pressure source.

The trailer roof 18 has a dome 94 projecting upward from its top surface. The dome 94 is used in attic venting training. The dome 94 has a plurality of sloped flat knockout panels 96. The trainee may climb onto the trailer roof 18 with an axe or a similar tool using a ladder and practices venting a structure by knocking out the knock out panels 96. The knockout panels 96 are held onto the dome by suitable brackets 98.

A smoke generator 100 (FIG. 4) is disposed outside the trailer 12 proximate the second end wall 44. The smoke generator 100 drips oil onto a hot plate surface and a fan pumps smoke into the trailer 12 and the confined space 14. The simulator 10 further includes a smoke evacuation fan 102 for exhausting smoke from the trailer 12 and the confined space 14.

By way of example, a trainee may use the simulator 10 by entering the trailer 12 through the first door 30 into the staging area 26. A trainer is situated in the master control room 86 to monitor and control the training exercise. Once the trainer signals the trainee to begin the exercise, the trainee exits the staging area 26 through the partition door 40 and enters the second room 32. The trainer can remotely ignite gas burners 34A and 34B. The trainee then can be trained and graded based on how the trainee copes with the ignited gas burners. Once the trainer observes through the clear panel 88 that the trainee has mastered the kitchen fire training, the trainee enters the third room 42.

The trainer may remotely ignite the burner unit 46, and observes and grades the trainee as the trainee extinguishes the fire created by the burner unit 46. If the trainee wishes to raise the difficulty of the test, both burner units may be ignited. Alternatively, the trainer may have previously ignited the combustible panel 56. The trainee is then able to practice and be graded upon how well he chops down the combustible panel. Second, the trainee must set up the tri-pod winch 64 and operate the crank 68 to lift a person out of the confined space 14 by the cable 66. The trainee can then exit the trailer 10 through the access panel 62, and enters the confined space 14. The trainer may have filled the confined space 14 with smoke, and the trainee is graded on the trainee's ability to exit the confined space 14.

Alternatively, the trainee may be directed to exit the third room 42 through the second door 72, and enter the enclosed declining staircase 74. The trainer may either remotely ignite a gas burner panel, or fill the enclosed staircase 74 with smoke, or both. The trainee is then graded on how he progresses down the staircase 74 and exits through the enclosure door 84. Once outside the trailer 12, the trainee may be directed to climb on top of the trailer 12 to vent the attic. Once on top of the roof, the trainee uses his axe to knock out the sloped flat knock out panels 96 to vent the trailer. The trainee then can knock out the knock out plexiglass 92 using a high pressured fire hose.

The foregoing description of the preferred embodiment is provided to meet the disclosure requirements of the patent laws. It is not intended to be limiting. The scope of the invention is defined exclusively by the following claims.

What is claimed is:

1. A mobile simulator for use in firefighting training exercises comprising a semi-trailer having a generally closed rectangular body and including a plurality of partitions for dividing the body into a plurality of rooms including;
    i) a first room located at a first end of the trailer used for storage when the mobile simulator is not in use and as a staging area for the training exercise when the simulator is in use;
    ii) a second room proximate the first room simulating a kitchen and containing a first fuel gas burner for providing flames during the training exercises;
    iii) a third room located at a second end of the trailer and having at least one further fuel gas burner unit used for hot room training, said third room further including an access panel for entering and exiting the third room to and from the confined space, a means for simulating wall fire conditions when firefighting, and a combustible panel releasably attached to the ceiling for simulating a falling ceiling; and
    iv) a master control room having windows whereby an operator can monitor the process of a trainee and control the delivery of natural gas to said burner units.

2. The mobile simulator in claim 1, and further including a declining staircase module adapted to be placed adjacent the trainer body and wherein the third room includes a door exiting the trailer body into the enclosed declining staircase module.

3. The mobile simulator in claim 2 and further including a propane burner located underneath the enclosed declining staircase for simulating a stair fire.

4. The mobile simulator in claim 1 wherein the semi-trailer further includes at least one knock out window in a wall of said rectangular body which can be blown out by a water stream discharged from a fire hose.

5. The mobile simulator in claim 1 and further including a smoke generator for directing smoke from the smoke generator into selected ones of the plurality of rooms and into the confined space in a controlled manner.

6. The mobile simulator in claim 5 and further including at least one exhaust fan for exhausting smoke from the plurality of rooms and the confined space.

7. The mobile simulator in claim 1 where the first room has a door for entereing the trailer.

8. The mobile simulator in claim 1 where there are passageways in the partitions to allow movement between the plurality of rooms.

9. The mobile simulator in claim 1 where the second room has a gas range, range hood, and cabinets for simulating a kitchen with a fuel gas burner located near the range and in the cabinets.

10. The mobile simulator in claim 1 wherein the means for simulating wall fire conditions includes at least one further burner unit disposed proximate a floor surface of the rectangular body.

* * * * *